United States Patent
Frederiksen et al.

(10) Patent No.: US 7,727,660 B2
(45) Date of Patent: Jun. 1, 2010

(54) MODIFIED FUEL CELLS WITH INTERNAL HUMIDIFICATION AND/OR TEMPERATURE CONTROL SYSTEMS

(75) Inventors: Henning Frederiksen, Svendborg (DK); Steen Yde-Andersen, Svendborg (DK); Laila Grahl-Madsen, Hesselager (DK); Joergen Schjerning Lundsgaard, Svendborg (DK)

(73) Assignee: IRD Fuel Cells A/S, Svendborg (DK)

( * ) Notice: Subject to any disclaimer, the term of this patent is extended or adjusted under 35 U.S.C. 154(b) by 916 days.

(21) Appl. No.: 11/487,610

(22) Filed: Jul. 17, 2006

(65) Prior Publication Data
US 2007/0172716 A1    Jul. 26, 2007

Related U.S. Application Data

(60) Provisional application No. 60/702,899, filed on Jul. 27, 2005.

(51) Int. Cl.
*H01M 2/14* (2006.01)
*H01M 8/12* (2006.01)

(52) U.S. Cl. .............. 429/39; 429/38; 429/26

(58) Field of Classification Search .................. 429/34, 429/38, 39, 35, 36, 37
See application file for complete search history.

(56) References Cited

U.S. PATENT DOCUMENTS

| | | | |
|---|---|---|---|
| 4,469,579 A | 9/1984 | Covitch et al. | 204/283 |
| 4,530,886 A | 7/1985 | Sederquist | 429/13 |
| 4,826,554 A | 5/1989 | McIntyre et al. | 156/280 |
| 4,973,530 A | 11/1990 | Vanderborgh et al. | 429/13 |
| 5,211,984 A | 5/1993 | Wilson | 427/115 |
| 5,272,017 A | 12/1993 | Swathirajan et al. | 429/33 |
| 5,316,871 A | 5/1994 | Swarthirajan et al. | 429/33 |
| 5,382,478 A | 1/1995 | Chow et al. | 429/26 |
| 5,399,184 A | 3/1995 | Harada | 29/623.4 |
| 5,472,799 A | 12/1995 | Watanabe | 429/30 |
| 5,474,857 A | 12/1995 | Uchida et al. | 429/33 |
| 5,702,755 A | 12/1997 | Mussell | 427/115 |
| 5,750,281 A | 5/1998 | Washington et al. | 429/39 |
| 5,958,613 A | 9/1999 | Hamada et al. | 429/26 |
| 5,965,288 A | 10/1999 | Okamoto | 429/26 |
| 5,981,098 A * | 11/1999 | Vitale | 429/34 |
| 6,066,408 A | 5/2000 | Vitale et al. | 429/26 |
| 6,106,964 A | 8/2000 | Voss et al. | 429/20 |
| 6,197,442 B1 | 3/2001 | Gorman | 429/13 |
| 6,416,895 B1 | 7/2002 | Voss et al. | 429/20 |

(Continued)

FOREIGN PATENT DOCUMENTS

DE    203 08 332 U1    2/2004

(Continued)

OTHER PUBLICATIONS

Bernardi, Dawn M., "Water-Balance Calculations for Solid-Polymer-Electrolyte Fuel Cells", J. Electrochem. Soc. 1990 137(11):3344-3350.

(Continued)

*Primary Examiner*—Dah-Wei D Yuan
*Assistant Examiner*—Stephan Essex
(74) *Attorney, Agent, or Firm*—Licata & Tyrrell P.C.

(57) ABSTRACT

Modified fuel cells with improved distribution of humidity and/or temperature are provided.

1 Claim, 13 Drawing Sheets

U.S. PATENT DOCUMENTS

| | | | | |
|---|---|---|---|---|
| 6,500,573 | B1 | 12/2002 | Simazu et al. | 429/22 |
| 6,632,555 | B2 | 10/2003 | Ding | 429/30 |
| 6,653,012 | B2 | 11/2003 | Suzuki et al. | 429/39 |
| 2002/0028370 | A1* | 3/2002 | Suenaga et al. | 429/35 |
| 2004/0137298 | A1 | 7/2004 | Sugiura et al. | 429/32 |
| 2004/0142224 | A1 | 7/2004 | Elhamid et al. | 429/35 |

FOREIGN PATENT DOCUMENTS

| | | |
|---|---|---|
| EP | 1 083 616 | 3/2001 |
| WO | WO 2004/070859 | 8/2004 |
| WO | WO 2004/102710 | 11/2004 |

OTHER PUBLICATIONS

Choi et al., "Water transport in polymer membranes for PEMFC", Journal of Power Sources 2000 86:197-201.

Sakai et al., "Gas Diffusion in the Dried and Hydrated Nafions", J. Electrochem. Soc. 1986 133(1):88-92.

Xie et al., "Water Transport Behavior in Nafion 117 Membranes", J. Electrochem. Soc. 1995 142(9):3057-3062.

Yeo et al., "Transport Properties of Nafion Membranes in Electrochemically Regenerative Hydrogen/Halogen Cells", J. Electrochem. Soc. 1979 126(10):1682-1687.

Fuller et al., "Experimental Determination of the Transport Number of Water in Nafion 117 Membrane", J. Electrochem. Soc. 1992 139(5):1332-1337.

* cited by examiner

MODIFIED FUEL CELLS WITH INTERNAL HUMIDIFICATION AND/OR TEMPERATURE CONTROL SYSTEMS

This patent application claims the benefit of priority from U.S. Provisional Application Ser. No. 60/702,899, filed Jul. 27, 2005, teachings of which are herein incorporated by reference in their entirety.

FIELD OF THE INVENTION

The present invention relates to modified fuel cells with improved distribution of humidity and/or temperature.

BACKGROUND OF THE INVENTION

Fuel cells are electrochemical energy conversion devices considered as a possible alternative to internal combustion engines. Fuel cells convert a hydrogen containing fuel such as methanol or hydrogen to electrical energy by an oxidation reaction. A by-product of this reaction is water. Adequate output voltage entails the assembly of multiple fuel cells, connected in series, into fuel cell stacks.

Various proton exchange membrane (PEM) fuel cells have been described.

One type of PEM fuel cell comprises a solid polymer electrolyte (SPE) membrane, such as a sulfonated fluorinated polymer membrane material known as Nafion, which provides ion exchange between cathode and anode electrodes. Various configurations of SPE fuel cells as well as methods for their preparation have been described. See e.g. U.S. Pat. Nos. 4,469,579; 4,826,554; 5,211,984; 5,272,017; 5,316,871 5,399,184; 5,472,799; 5,474,857; and 5,702,755.

PEM fuel cells operate properly only if the membrane is sufficiently wet. A supply of water is required to retain proton conductivity of the polymer membrane and water management is essential for enhancement of cell performance (Choi et al. J. Power Source 2000 86:197-201; Fuller, T. F. and Newman, J. J. Electrochem. Soc. 1992 139:1332; Xie, G. and Okada, T. J. Electrochem. Soc. 1995 142:3057; Bernardi, D>M. J. Electrochem. Soc. 1990 137:3344; Sakai et al. J. Electrochem. Soc. 1986 133:88 and Yeo, R. S. and McBreen, J. J. Electrochem. Soc. 1979 126:1682).

Typically, hydration is maintained by humidification of the reactant streams prior to introduction into the electrochemically active regions of the fuel cell. Such systems also typically require heating of the fuel prior to its introduction into the fuel cell. A system providing both heat and humidification to the reactant stream prior to entry into the fuel cell is described in U.S. Pat. No. 4,530,886. The required humidification and heating apparatus of such systems, however, add complexity to the fuel system as components such as a humidification water pump, piping, a water reservoir and a filtration unit, in addition to the humidification module and heater, are also needed. Further, additional power is required for operating the pumps and heating the stream.

Thus, various attempts have been made to provide simpler, more energy efficient means for providing temperature control and/or humidification to fuel cells.

For example, U.S. Pat. No. 5,382,478 describes an electrochemical fuel stack with a humidification section located upstream from the electrochemically active section. The upstream location of the humidifier allows for fewer manifolds in the fuel cell, thereby maximizing space for the electrochemical reaction to occur.

U.S. Pat. No. 6,500,573 discloses a humidifier device for use with fuel cells comprising a mist humidifier unit for adding mists to process gas supplied to an electrolyte equipped in a fuel cell. This device is further equipped with a unit control device for intermittently operating the mist humidifier unit in accordance with operating condition of the fuel cell.

U.S. Pat. No. 5,958,613 discloses a polymer electrolyte fuel cell system with a polymer electrolyte fuel cell made up of a cell main body, a mixture generator for generating a gas-liquid mixture by mixing fuel gas which has been supplied from a fuel gas supply with water, and a means for supplying the gas-liquid mixture to the anode-side channels. The gas-liquid mixture permits moistening of the solid-polymer membrane without requiring a humidifier to humidify fuel gas and oxidant gas and cools the cell main body without providing a cooling channel therein.

U.S. Pat. No. 6,653,012 describes a simpler humidifier having a plurality of water-permeable hollow fiber membranes placed along the lengthwise direction of the housing of the humidifier. Gases, each having a different moisture content flow inside and outside the hollow fiber membranes to carry out moisture exchange so that dry air having low moisture content is humidified.

Humidification of fuel cells has also been provided using water transport plates. Water transport plates are porous structures filled with water. During fuel cell operation, the water transport plate supplies water locally to maintain humidification of a proton exchange membrane, removes product water formed at the cathode, removes by-product heat via a circulating coolant water stream, conducts electricity from cell to cell, provides a gas separator between adjacent cells and provides passage for conducting the reactants through the cell.

U.S. Pat. No. 4,973,530 discloses a fuel cell with a first flow field for transporting a fuel gas and a second flow field for receiving the gas which also has a water transport membrane for regulating humidity of the gas within the first flow field.

U.S. Pat. No. 5,965,288 also describes a gas-humidifying device for use with a fuel cell in which water permeable membranes are provided with fuel gas passages and oxygen-containing passages formed on one side of the water permeable membrane and humidifying water passages formed on the other side of the membrane. Medium supply passages are also provided independently from, yet in proximity to the water passages, for supplying a medium having a melting point lower than that of water so that melting of the water in the interior of the humidifier can be easily and swiftly carried out.

U.S. Pat. No. 6,197,442 discloses a water transport plate for use in improving fuel cell operations comprising graphite powder, reinforcing fibers, cellulose fibers and a thermosetting resin, the slurry of which is showered onto a screen to form a planar sheet which is dried to form paper. The paper is then cut into a desired size, laminated under heat and pressure, carbonized and graphitized to form a water transport plate.

U.S. Pat. No. 6,066,408 also describes a plate, referred to as a cooler-humidifier plate for use in a proton exchange membrane (PEM) fuel cell stack assembly. This cooler-humidifier plate combines functions of cooling and humidification with the fuel cell stack assembly, thereby providing a more compact structure, simpler manifolding, and reduced reject heat from the fuel cells. In this plate, coolant on the cooler side of the plate removes heat generated within the fuel cell assembly. On the humidifier side of the plate, evaporating water humidified reactant gas flows over a moistened wick. After exiting the humidifier side of the plate, the humidified reactant gas provides needed moisture to the proton exchange membranes used in the fuel stack assembly. Structural support is maximized in this plate by ensuring that the ribs that form the boundaries of channels on one side of the plate have ends at locations that substantially correspond to the location of ribs on the opposite side of the plate.

U.S. Pat. No. 6,632,555 discloses a proton electrolyte membrane fuel cell having a closed coolant path within the fuel cell, a humidifier with a humidification fluid flow path and a fuel and air gas supply passage continuous in, through and out the humidifier. In this system, the humidifier and the fuel and air gas supply passage are separated by a water permeable membrane impervious to organic materials, but which allows water from the humidification fluid flow path to enter the fuel and air gas supply passage.

Self-humidifying systems for fuel cells have also been described.

For example, U.S. Pat. No. 6,106,964 describes a solid polymer fuel cell system and a method for humidifying and adjusting the temperature of a reactant gas stream wherein heat generated by the fuel cell and water vapor in a reactant stream exhausted from the fuel cell are used to heat and humidify the reactant gas stream prior to introduction into the fuel cell.

U.S. Pat. No. 6,416,895 also describes a solid polymer fuel cell heated and humidified using heat generated by the fuel cell and water vapor from the fuel cell exhaust. This is achieved by flowing a reactant gas supply stream and a fuel cell exhaust gas stream on opposite sides of a water permeable membrane in a combined heat and humidity exchange apparatus.

The present invention provides modified fuel cells with internal humidification and temperature control systems.

SUMMARY OF THE INVENTION

An aspect of the present invention is to provide fuel cells modified to comprise internal humidification and/or temperature control systems. In this invention, the anode and cathode separator plates used in the standard sandwich assembly have been modified to have the capability of supplying and exhausting three fed materials. Two of the materials are reactants, for example hydrogen and air. The third material is a coolant, preferably water conveniently available as a reaction product of the fuel and air or provided via ancillary equipment.

BRIEF DESCRIPTION OF THE FIGURES

FIG. 1 provides a diagram of the first face, referred to herein as face 1, of an embodiment of a modified anode separator plate used in the present invention. This diagram depicts an embodiment wherein the fuel inlet transfer cavity has been modified to comprise fuel inlet orifices which are fed fuel from the fuel inlet manifold via a fuel inlet transfer cavity and fuel outlet orifices by which expended fuel exits via the fuel outlet transfer cavity and the fuel outlet manifold.

FIG. 2 provides a diagram of the second face, referred to herein as face 2, of the embodiment of the modified anode separator plate of FIG. 1 comprising an anode flow field with modified fuel delivery and fuel exit channels corresponding to the fuel inlet orifices and fuel outlet orifices depicted in FIG. 1.

FIG. 3 provides a diagram of the third face, referred to herein as face 3, of an embodiment of a modified cathode separator plate used in combination with the anode separator plate depicted in FIGS. 1 and 2 in the assembly of a fuel cell of the present invention. Face 3 of this modified cathode separator plate is placed adjacent to face 2 of the modified anode separator plate depicted in FIG. 2 and comprises a cathode flow field comprising gas delivery channels and gas outlet channels running parallel to the anode flow field of face 2.

FIG. 4 provides a diagram of the fourth face, referred to herein as face 4, of the modified cathode separator plate of FIG. 3 used with the anode separator plate depicted in FIGS. 1 and 2 in assembly of a fuel cell of the present invention. As shown in FIG. 4, face 4 comprises a cooling chamber, which in this embodiment comprises a plurality of ribbed grooves, that extract heat from the cell, gas inlet orifices and gas outlet orifices which align with the fuel inlet orifices and fuel outlet orifices of face 1 of the modified anode separator plate depicted in FIG. 1, and constricting channels which aid in the entrainment of condensed water from the cells and prevent blockage.

FIG. 5 provides a diagram of face 1 of the anode separator plate showing the fuel inlet and fuel outlet orifices. In this embodiment, face 1 of the anode separator plates comprises a cooling chamber.

FIG. 6 provides a diagram of face 2 of the anode separator plate with fuel transfer occurring through anode flow field via fuel delivery channels fed from the fuel inlet orifices of face 1 and exiting by the fuel outlet orifices depicted in face 1.

FIG. 7 provides a diagram of face 3 of a cathode separator plate used with the anode plate of FIGS. 5 and 6 in assembly of a fuel cell of the present invention. Face 3 shows the cathode flow field which, in this embodiment, comprises a plurality of gas delivery channels and a plurality of coolant delivery channels extending across the plate adjacent and parallel to each other and perpendicular with respect to the anode flow field.

FIG. 8 provides a diagram of face 4 of this embodiment and shows the gas and coolant inlet manifolds coupled to gas inlet orifices and coolant inlet orifices, respectively, as well as the cooling chamber.

FIG. 9 provides a diagram of face 1 of the anode separator plate of this embodiment showing the fuel inlet orifices and fuel inlet transfer cavity modified in similar form to the plate depicted in FIG. 1, thus providing fuel inlet orifices which are fed fuel from the fuel inlet manifold via the fuel inlet transfer cavity and fuel exit orifices by which expended fuel exits to the fuel outlet manifold via the fuel exit transfer cavity.

FIG. 10 provides a diagram of face 2 of the anode separator plate with transfer of fuel fed from the fuel inlet orifices of face 1 occurring across an anode flow field which comprises not grooves, but rather a pattern of raised dots. Fuel exits the plate via the fuel outlet orifices depicted in face 2.

FIG. 11 provides a diagram of face 3 of this embodiment showing the cathode flow field face as a plurality of raised dots, each dot having an open channel extending through to face 4 of the cathode separator plate. Also shown in FIG. 11 are the gas inlet orifices by which gas enters the cathode flow field and the gas outlet orifices by which gas exits the cathode flow field.

FIG. 12 provides a diagram of face 4 of this embodiment comprising a cooling chamber of ribbed grooves, each groove having a plurality of open channels through which coolant can traverse the plate and exit at the center of the raised dots of the cathode flow field of face 3.

DETAILED DESCRIPTION OF THE INVENTION

Figure 1:
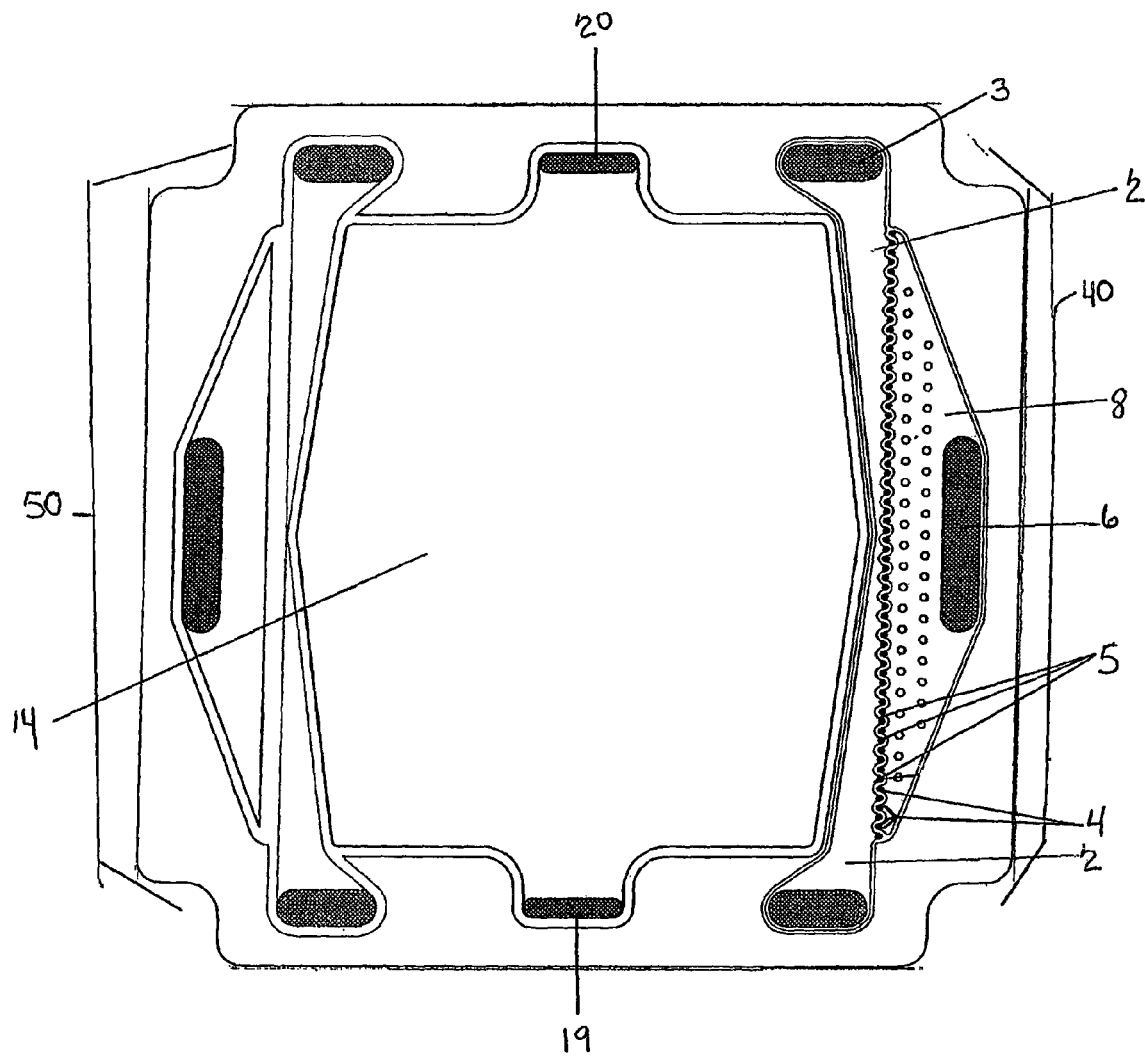
FIGS. 1 through 4 provide diagrams for the four faces of the anode and cathode separator plates used in one embodiment of a fuel cell of the present invention.

Membrane electrode assemblies (MEA) for fuel cells are typically formed by bonding of a cathode catalyst, a solid polymer electrolyte (SPE) layer and an anode. A porous conductive carbon cloth is placed in between each MEA and a separating element. A fuel cell stack of fuel cells connected in series is made by repeating the sequence described above so that a multiplicity of single cells forms the stack.

The separating element serves to transport reactants and products to and from the fuel cell and thus is also often referred to as a flow-plate. The separating element also manages heat output of the fuel cell, by transferring or distributing heat generated by the fuel cell to its surroundings. Typically, the separating element comprises a separator sandwich formed by placing an anode plate with two faces, referred to herein as face 1 and face 2, over a cathode plate, also with two faces referred to herein as face 3 and face 4, in the following sequence. Face 1 of the anode plate serves as the anode separator face with transfer cavities while face 2 of the anode plate serves as the anode separator flow field. Face 1 of the anode plate is adjacent to the separator face with transfer cavities of face 4 of an adjacent cathode plate of an adjacent fuel cell unit of the stack. Face 3 of the cathode plate serves as the cathode separator flow field. Thus, face 2 of the anode separator plate is placed in contact with face 3 of the corresponding cathode separator plate. This assembly forms the integral separator sandwich in the conventional cell. Apertures and orifices on the cathode flow plate and the anode flow plate are arranged so that the appropriate reactants are fed to either the anode surface or the cathode surface via manifolds and transfer cavities enclosed by the plane surface of the opposing separator plate element. Leakage is prevented by polymeric seals placed in grooves surrounding these cavities.

Since properties of the cathodic and anodic reactants are different, the flow pattern and channel configuration and design are adapted to the particular material being transported to the MEA via the channels in the separator plate. A system of apertures in the separator plates form a common supply channel for each of the reactants and traverses the stack, supplying reactants to each fuel cell via apertures arranged on the appropriate separator plate faces. Thus, an oxidant is supplied to the cathode where reduction occurs and a hydrogen containing fuel such as hydrogen or methanol is supplied to the anode where oxidation occurs.

Separating elements are typically manufactured from conducting carbon composites, such as that supplied as SIGRACET Bipolar Plate BMA 5 by SGL Carbon, Meitingen, Federal Republic of Germany.

Conductivity of the MEA and thus efficiency of the fuel cell stack is dependent upon both humidity and temperature. Humidity and temperature must thus be controlled throughout the stack in spite of the varied and transient effects of cell operation which affect the local temperature and humidity of the MEA.

A key to efficient control of these relationships is heat and mass transport phenomena in the flow system. Reactants must be supplied at the required rate while products and heat formation is dealt with.

The present invention provides anode and cathode separator plates for use in sandwich assembly of fuel cells which provide internal control systems for humidity and/or heat.

One embodiment of an anode separator plate and cathode separator plate used in assembly of a fuel cell of the present invention is depicted in FIG. 1 through 4. The separator plates of this embodiment are designed to have the capability of supplying and exhausting three fed materials. Two of the materials are reactants, for example hydrogen and air. The third material is preferably a coolant, more preferably water conveniently available as a reaction product of the fuel and air or provided via ancillary equipment used routinely by those skilled in the art. In this embodiment, the water is used to humidify and cool the reactants while circulating in a plurality of cavities formed between two consecutive interconnecting separators in the stack.

This fuel cell comprising an anode separator plate with a first face and a second face and a first end 40 and second end 50, and a cathode separator plate with a third face and a fourth face and a third end 60 and a fourth end 70 is depicted in FIGS. 1 through 4.

Figure 2:
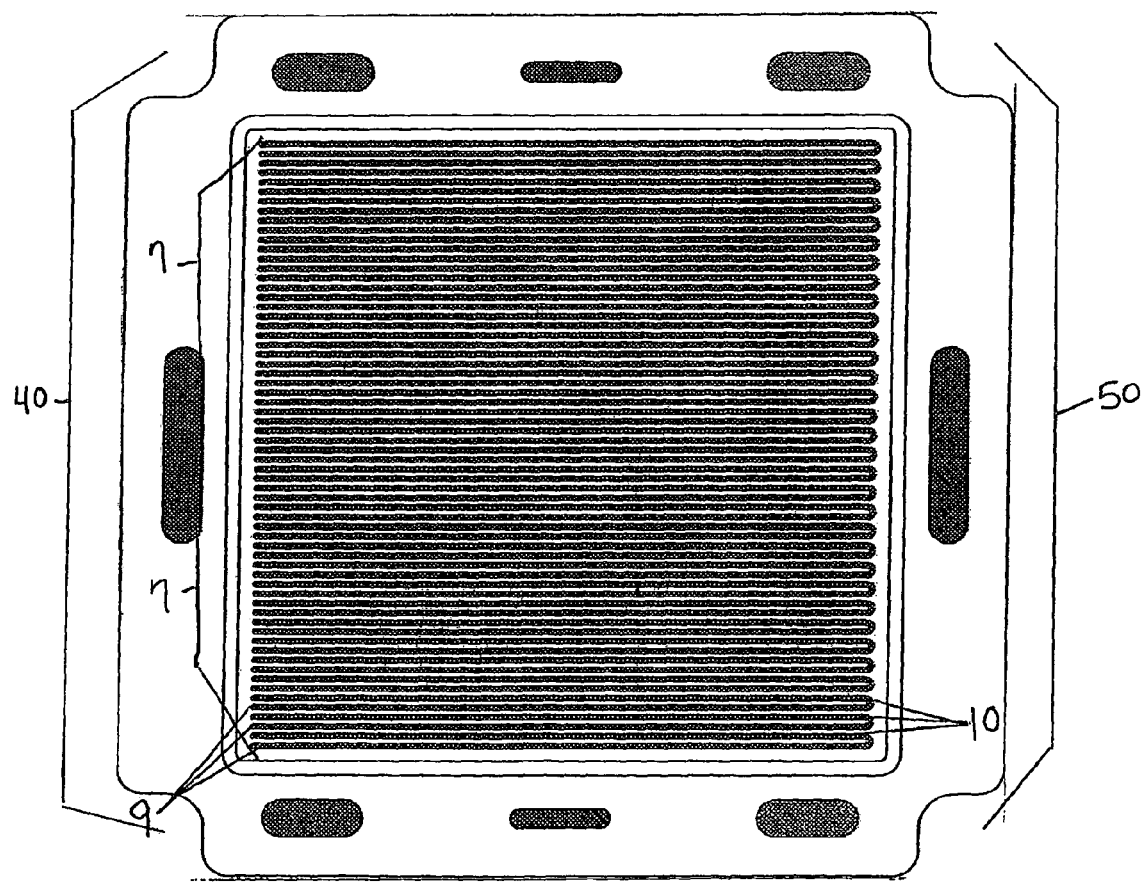
Figure 4:
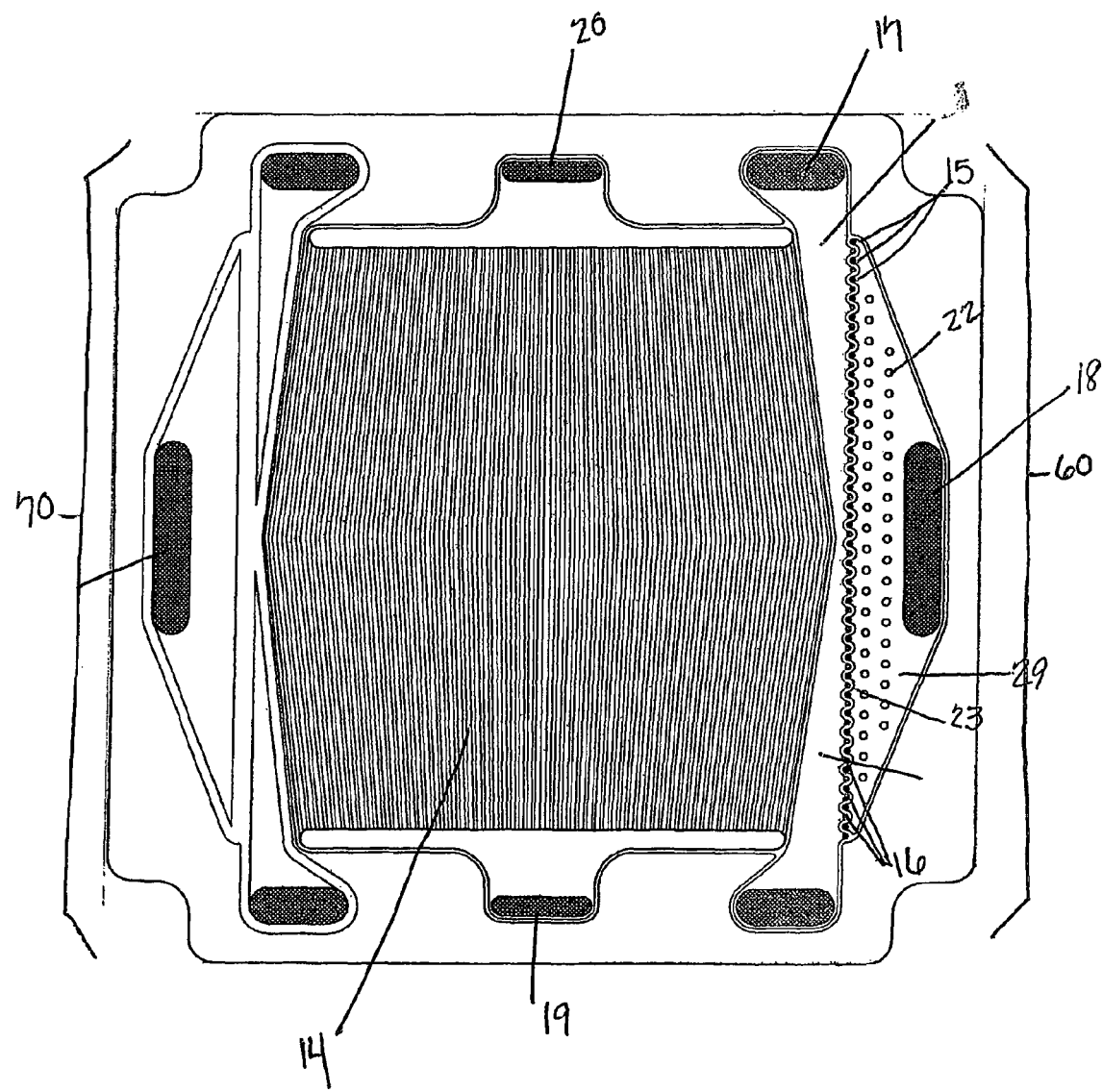

The first face, face 1 of an anode separator plate used in this embodiment of a fuel cell of the present invention is depicted in FIG. 1. This first face of the anode separator plate in the sandwich pair provides the following functional features. A fuel inlet transfer cavity 2 feeds fuel from a fuel inlet manifold 3 to the anode flow field 7 on face 2 of the anode separator plate via a plurality of fuel inlet orifices 4 located at the first end 40 of the anode separator plate while a plurality of fuel outlet orifices 5, also located at the first end 40 of the anode separator plate allow expended fuel from face 2 of the anode separator plate to exit via the fuel outlet transfer cavity 8 and the fuel outlet manifold 6. Thus, fuel enters the anode flow field 7 of face 2 of the anode separator plate depicted in FIG. 2 and flows across the plate from the first end 40 to the second end 50 via a plurality of fuel delivery channels 9. Expended fuel is then expelled via fuel exit channels 10. As shown in FIG. 2, each fuel exit channel 10 is connected to and located adjacent to a fuel delivery channel 9 and extends from the second end 50 to the first end 40 of the anode separator plate. The fuel exit channels 10 return spent fuel to the fuel outlet transfer cavity 8 and the fuel outlet manifold 6. The fuel inlet orifices 4 and fuel outlet orifices 5 thus alternate as feed and exhaust and are separated by an undulating sealed barrier 23, on an adjacent cathode separator plate as shown in FIG. 4. The sealed barrier 23 directs the supply from the fuel inlet transfer cavity 2 to the fuel inlet orifices 4 and the exhaust from the fuel outlet orifices 5 to the fuel outlet manifold 6 via the fuel outlet transfer cavity 8. The other main function of the separator plate of this embodiment is to provide a cooling cavity 14 in which water can serve as a coolant. Cool water enters the cavity from the coolant inlet manifold 19 and leaves via the coolant outlet manifold 20.

The second face, face 2 of the anode separator plate is depicted in FIG. 2. This is the reverse side of the anode separator plate of the separator sandwich and interfaces with the gas diffusion membrane which separates the MEA from the flow field. The principal function of face 2 is to supply fuel to the MEA. In order for the MEA to work effectively it must not dry out especially when operating at high power. In this embodiment of the present invention, humidity is provided by the expended fuel in the counter-flow through the fuel exit channels 10. The relatively moist exit fuel transfers humidity to the fuel via diffusion in the Gas Diffusion Layer (GDL) of the MEA in between the anode and cathode plates.

Figure 3:
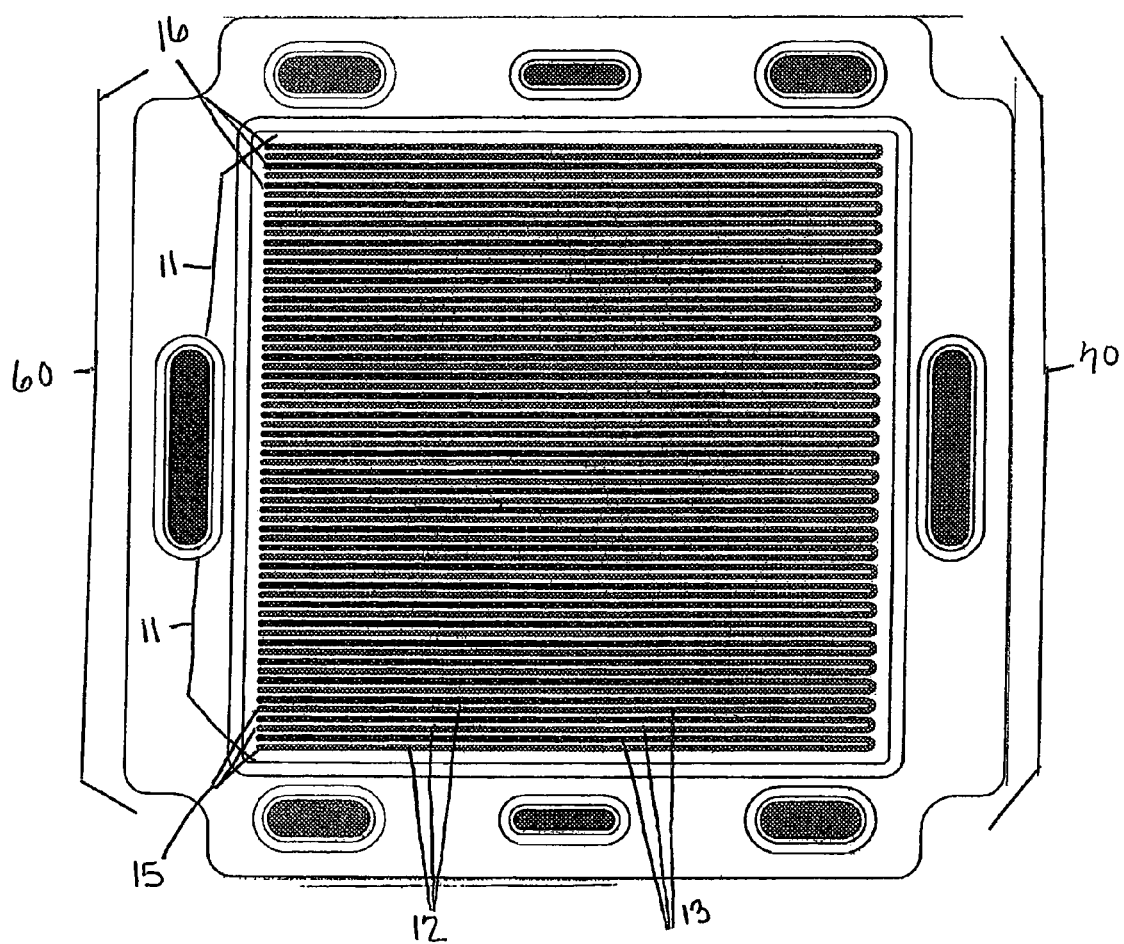

The faces of a cathode separator plate used in this embodiment of the present invention are depicted in FIGS. 3 and 4.

FIG. 3 shows the third face, referred to herein as face 3 of the cathode separator plate in the sandwich pair. Face 3 comprises the cathode flow field 11 for flow of gas, preferably air or oxygen, and shows the gas inlet orifices 15 and gas outlet orifices 16 positioned at the third end 60 of the cathode separator plate. At the interface between face 3 of the cathode separator plate and the MEA and the gas diffusion layer, water accumulates and is led away in the spent gas stream. The gas leaving the cathodic flow field is very humid and may be more or less saturated dependent on operating conditions. The gas entering the cathode area is normally quite dry due to rise in temperature in the stack and becomes more humid as the reaction product accumulates along the flow path. As it is important to distribute humidity as evenly as possible in the MEA it is desirable to design fuel cells so that the membrane remains sufficiently moist. Thus, a counter current flow is again used to extract water from the exiting air in the plurality of gas outlet channels 13 and transfer it to the gas feed in the plurality of gas delivery channels 12. As shown in FIG. 3, each gas outlet channel 13 is connected and adjacent to a gas delivery channel 12. The gas delivery channel extends from the third end 60 to the fourth end 70 of the plate while the gas outlet channels extends back across the cathode separator plate from the fourth end 70 to the third end 60. This design permits the outflow to be cooled by maintaining vaporization and the entry gas to be heated and humidified in order to maintain and improve the water distribution in the MEA. Further, connection of a gas delivery channel 12 to an adjacent gas outlet channel 13 provides for a counter current diffusion process which transfers moisture to the dry side and at the same time prevents condensation in the cathode flow field 11 so that channels to not become blocked by condensation as is often the case for conventional flow fields.

Distribution of humidity can be further facilitated by using a hydrophilic gas diffusion layer in the MEQ. Hydrophilically treated carbon diffusion layers are commercially available. An example is SIGRACET® Gas Diffusion Media from SGL CARBON GmbH (Werner-von-Siemens-Str. 18,86405 Meitingen Germany).

The final fourth face of this embodiment of a sandwich assembly, referred to herein as face 4, is the reverse side of the cathode separator plate and is depicted in FIG. 4. Face 4 functions to direct the gas streams towards a gas inlet manifold 17 and a gas outlet manifold 18, to assist in the transfer of condensed water from the coolant inlet manifold 19 across the plate to the coolant outlet manifold 20, and to provide an efficient cooling surface comprising a cooling chamber 14 in order to extract heat from the cell for disposal or as an heating source. In this embodiment, the cooling chamber 14 preferably comprises a plurality of ribbed grooves. Coolant, most conveniently water, enters and exits the ribbed grooves of the cooling chamber 14 via the coolant inlet and coolant outlet manifolds 19 and 20, respectively, and flows along the surface of the cooling chamber 14 thereby extracting heat from the cell to be disposed of as required in ancillary equipment. As also shown in FIG. 4, a plurality of gas inlet orifices 15 on face 4 positioned at the third end 60 transport dry air to the cathode flow field 11 on face 3 while a plurality of gas outlet orifices 16 positioned at the third end 60 direct the expended gas to the gas outlet manifold 18 via a gas outlet transfer cavity 29 with constricting channels 22. The constricting channels 22 aid with the entrainment of condensed water from the cell and prevent blockage. A dyke 21 divides the gas inlet and gas outlet orifices in alternating fashion towards the appropriate gas delivery channel or gas outlet channel on the opposing cathode flow field face. Face 4 also shows the sealed barrier 23, which abuts up to an adjacent anode plate in series.

Another embodiment of a fuel cell of the present invention is depicted in FIGS. 5 through 8. The anode and cathode separator plates of this embodiment are also designed to have the capability of supplying and exhausting three fed materials. Two of the materials are reactants, for example hydrogen and air. The third material is a coolant, preferably water conveniently available as a reaction product of the fuel and air or provided via ancillary equipment used routinely by those skilled in the art. In this embodiment, free water is introduced into the cathode flow field 11 via coolant delivery channels 24 adjacent and parallel to the gas delivery channels 12 of the cathode plate. The water is thereby introduced to a consecutive interconnecting separator in the stack through an MEA to a cooling cavity 14 of an adjacent anode plate.

Figure 5:
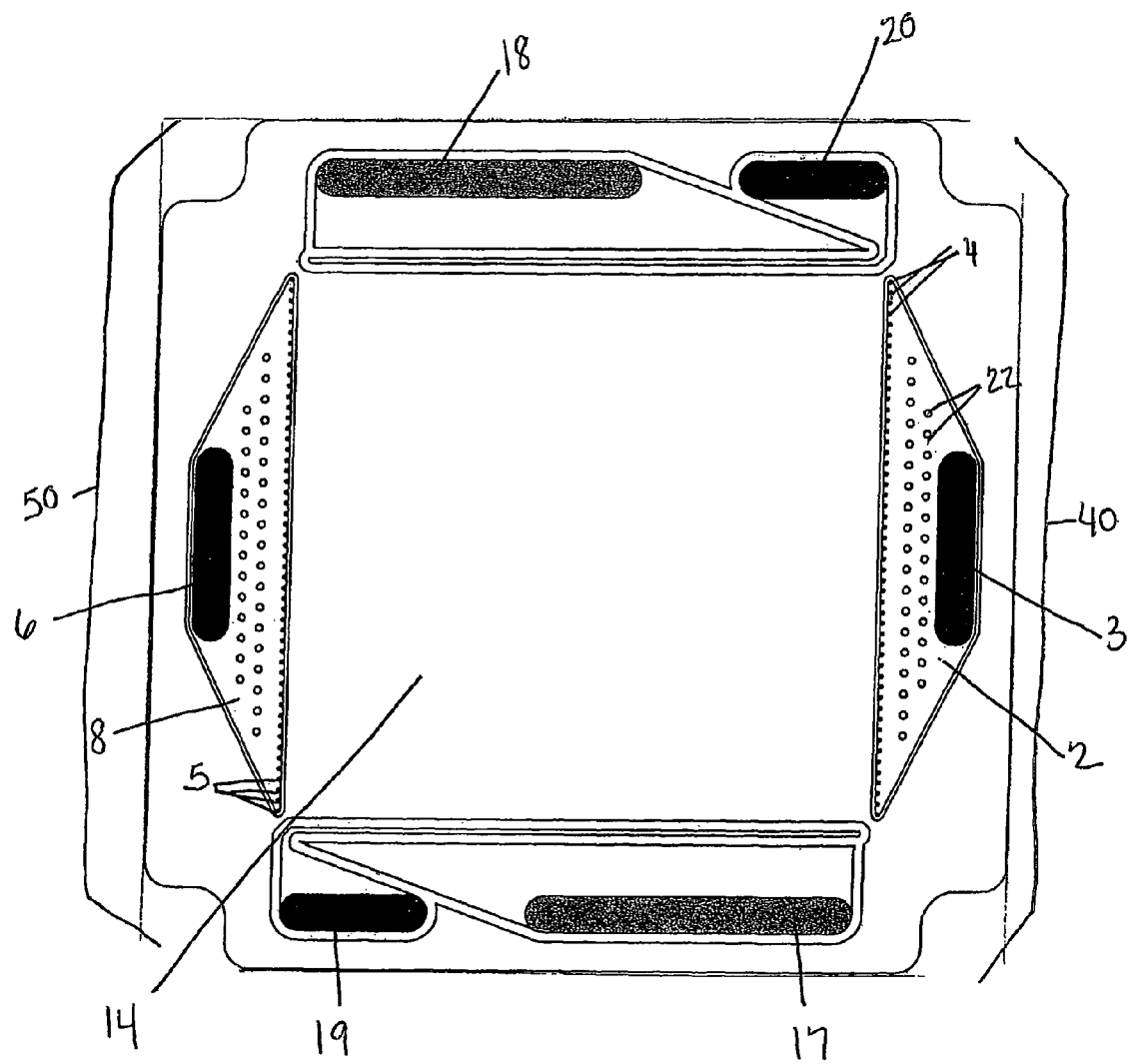
FIGS. 5 through 8 provide diagrams for the four faces of the anode and cathode separator plates used in another embodiment of a fuel cell of the present invention.

The first face, face 1 of an anode separator plate used in this embodiment of the present invention is depicted in FIG. 5. This first face of the anode separator plate in the sandwich pair provides the following functional features. A fuel inlet transfer cavity 2 feeds fuel from fuel inlet manifold 3 to the anode flow field 7 on face 2 of the anode separator plate via a plurality of fuel inlet orifices 4 positioned at the first end 40 while a plurality of fuel outlet orifices 5 positioned at the second end 50 allow expended fuel from face 2 of the anode separator plate to exit via the fuel outlet transfer cavity 8 and the fuel outlet manifold 6. Thus, fuel enters the anode flow field 7 of face 2 of the anode separator plate depicted in FIG. 6 and flows across the plate via a plurality of fuel delivery channels 9. Expended fuel is then expelled at the opposite end of the plate, also referred to herein as the second end 50 through fuel outlet orifices 5 to the fuel outlet manifold 6. The other main function of the separator plate of this embodiment is to provide a cooling cavity 14.

Figure 6:
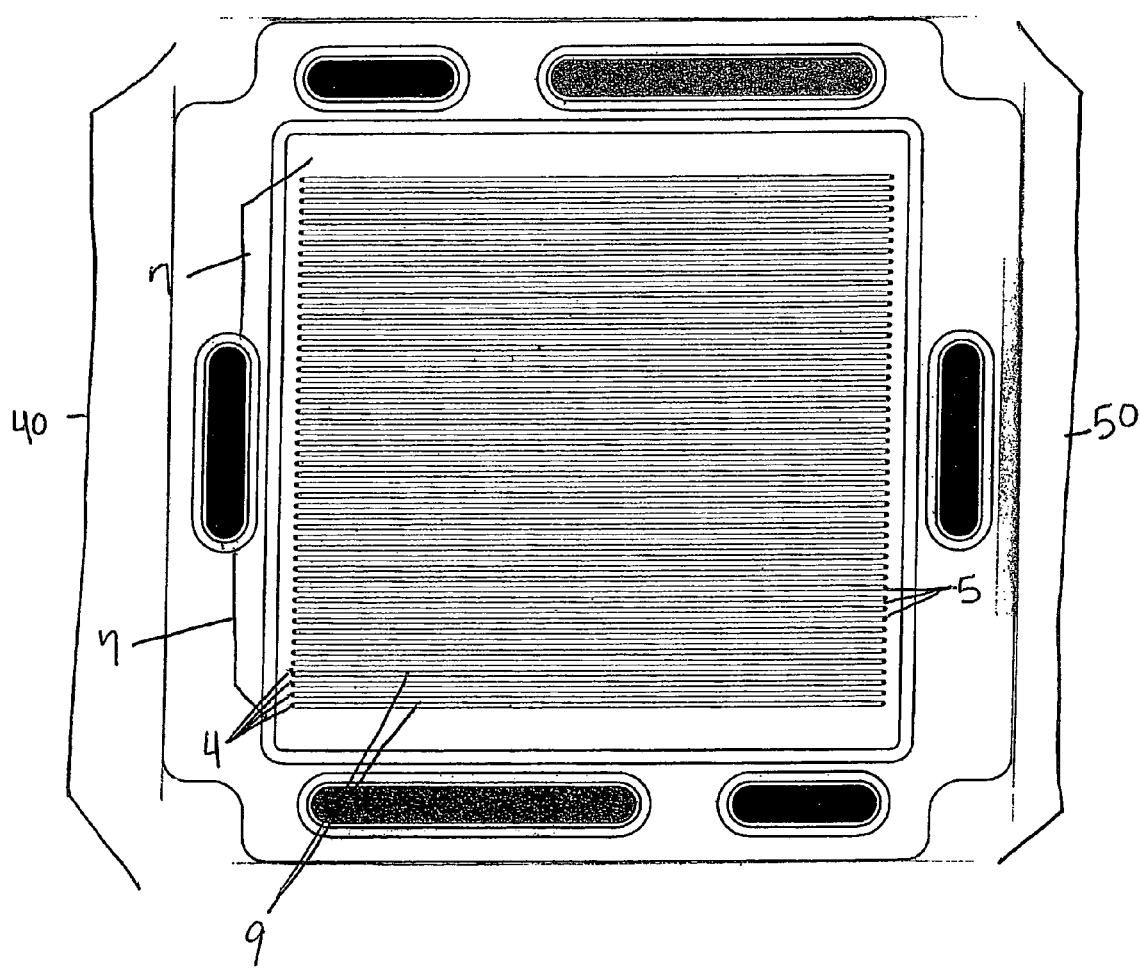

The second face, face 2 of the anode separator plate is depicted in FIG. 6. This is the reverse side of the anode separator plate and interfaces with the gas diffusion membrane which separates the MEA from the flow field. The principal function of face 2 is to supply fuel to the MEA.

As discussed above, in order for the MEA to work effectively it must not dry out especially when operating at high power. In the embodiment of the present invention depicted in FIGS. 5 through 8, water is introduced to the MEA via the cathode separator plate.

Figure 7:
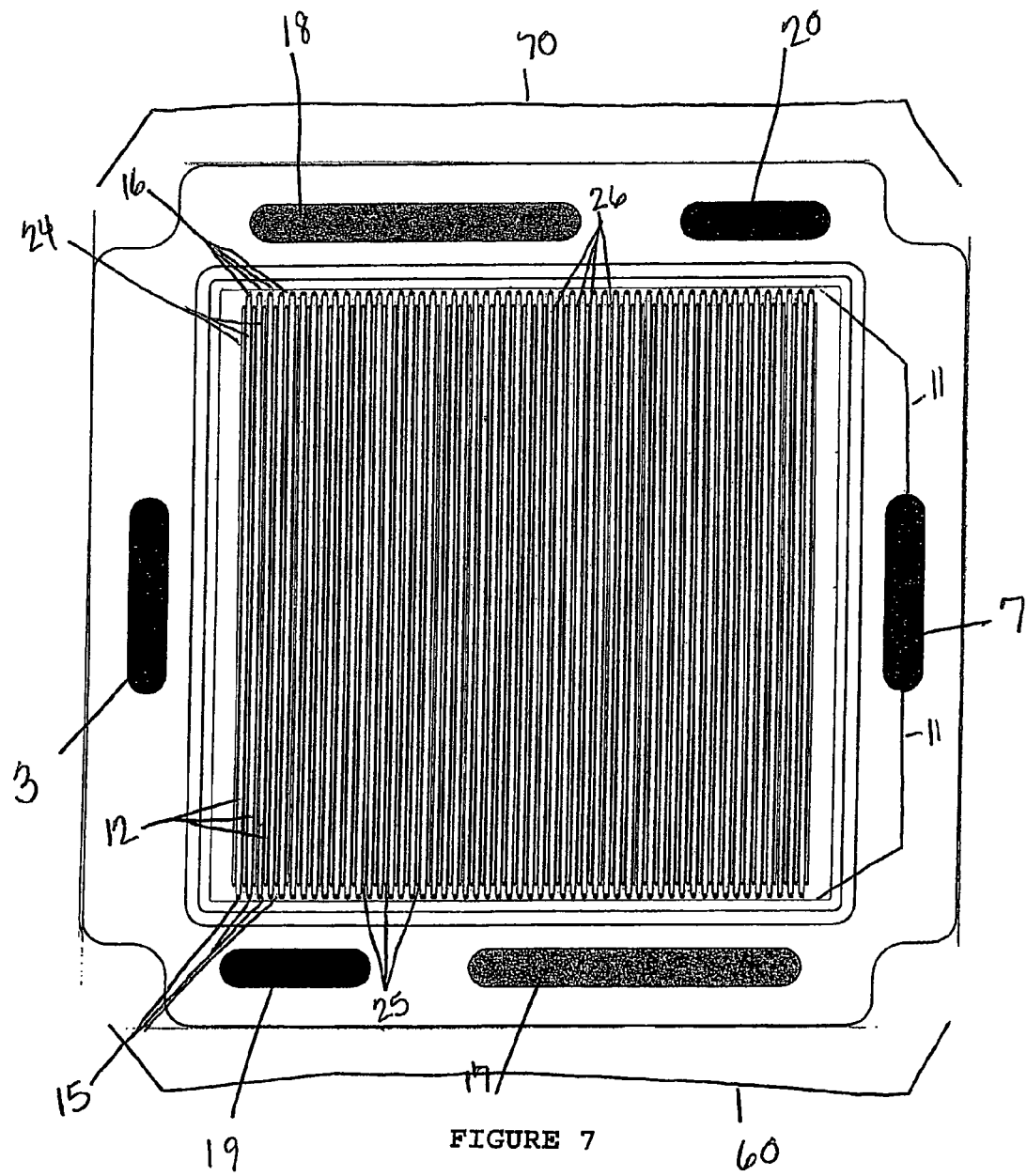
Figure 8:
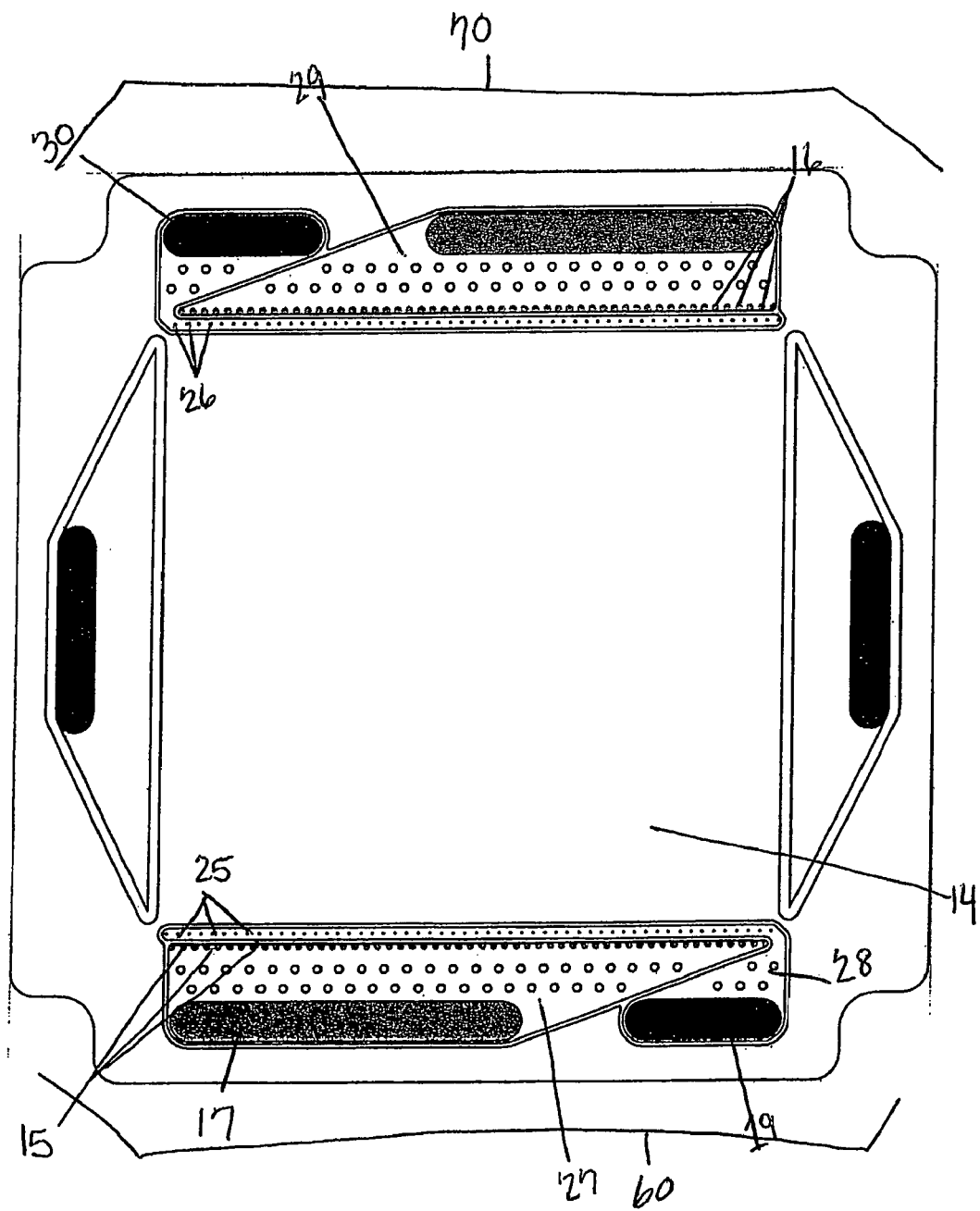

The faces of the cathode separator plate used in this embodiment of the present invention are depicted in FIGS. 7 and 8. In the cathode separator plate, coolant inlet orifices 25 positioned at the third end 60 of the cathode separator plate and depicted in FIG. 8 of face 4, are provided which open out into coolant delivery channels 24 on face 3, the cathode flow field face, depicted in FIG. 7. The coolant delivery channels 24 extend across the plate parallel to the gas delivery channels 12 of the cathode flow field 11 and perpendicular to fuel delivery channel 9 of the anode flow field 7 of face 2 (FIG. 6). Coolant exits the channels via coolant exit orifices 26 positioned at the fourth end 70 of the cathode separator plate extending from face 3 to face 4.

FIG. 7 shows face 3 of the cathode separator plate used in this embodiment. Face 3 comprises the cathode flow field 11 of gas delivery channels 12 for flow of gas, preferably air or oxygen, and shows the gas inlet orifices 15 positioned at the third end 60 and gas outlet orifices 16 positioned at the fourth end 70. Face 3 further comprises coolant delivery channels 24.

The final face of this embodiment of the present invention, face 4, is the reverse side of the cathode separator plate and is depicted in FIG. 8. Face 4 functions to direct the gas streams towards a gas inlet manifold 17 and a gas outlet manifold 18. Face 4 also functions to direct coolant, preferably water, toward a coolant inlet manifold 19 and coolant outlet manifold 20. Coolant, most conveniently water, thus enters and exits coolant delivery channels 20 on face 3 of the cathode separator plate via the coolant inlet and outlet manifolds 19 and 20 and flows parallel to the gas delivery channels 12 and perpendicular to the fuel delivery channels 9 of the anode flow field 7. Gas in the gas delivery channels adjacent to the coolant delivery channels is humidified as it travels toward the outlet manifolds.

Figure 9:
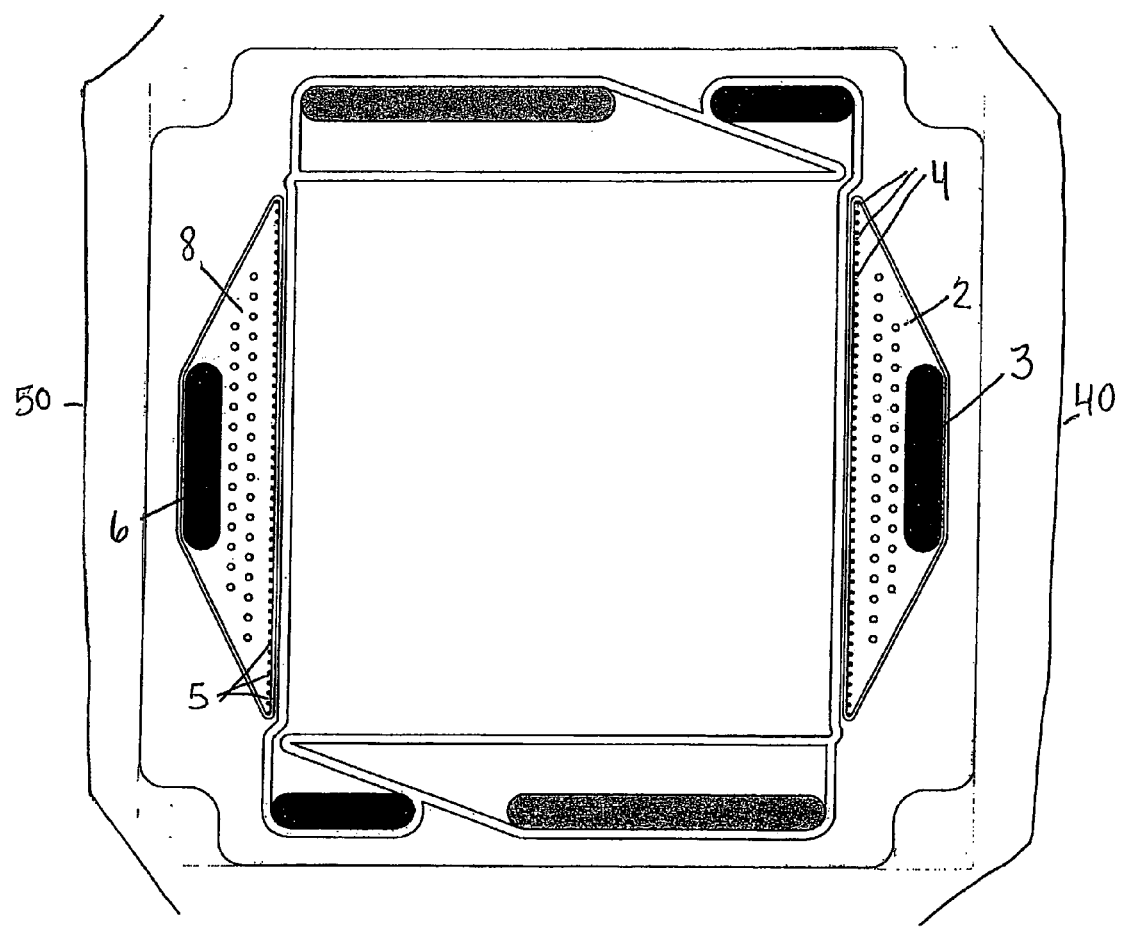
FIGS. 9 through 12 provide diagrams for the four faces of the anode and cathode separator plates used in another embodiment of a fuel cell of the present invention.
Figure 10:
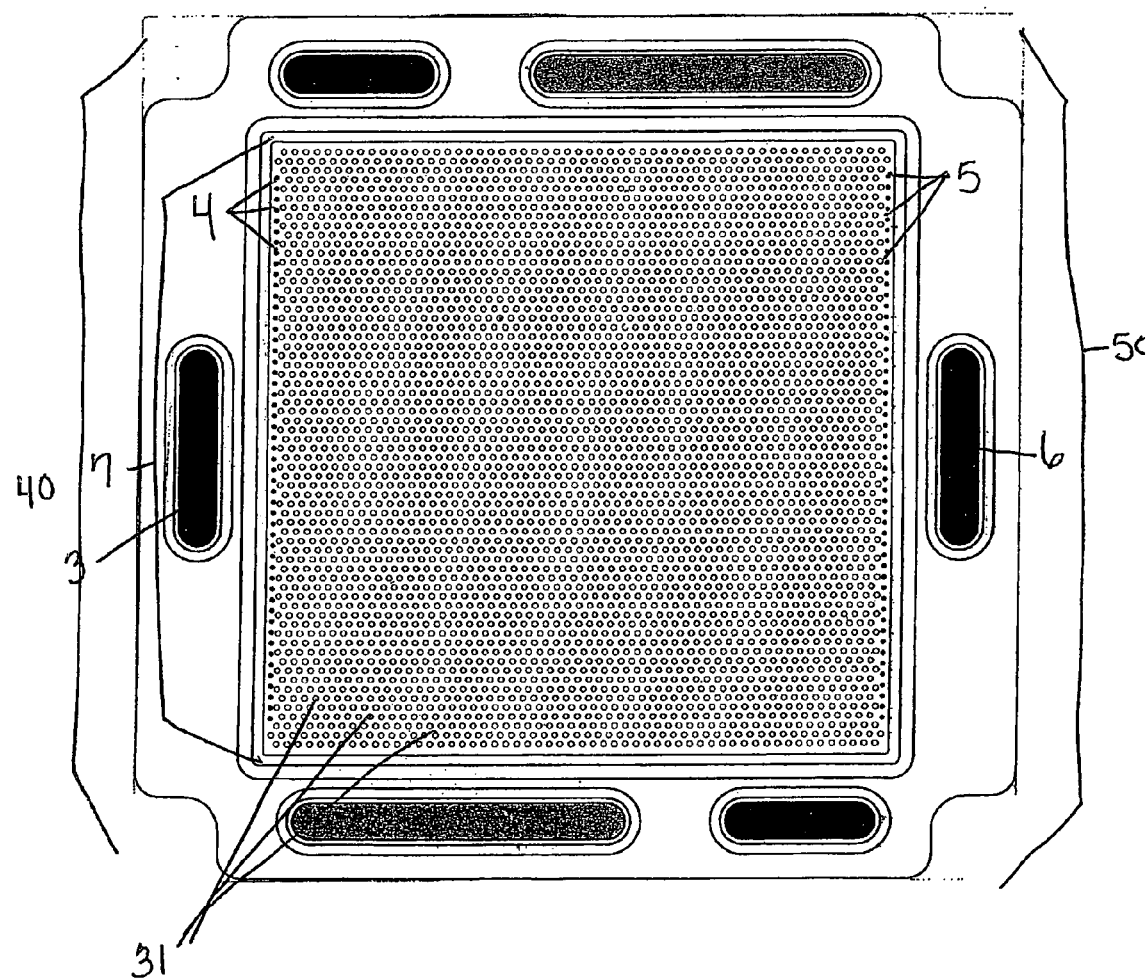

Another embodiment of a fuel cell of the present invention is depicted in FIGS. 9 through 12. Face 1 of the anode separator plate of this embodiment is depicted in FIG. 9. Like other embodiments described herein, face 1 of the anode separator plate feeds fuel to face 2 of the anode separator plate via a fuel inlet manifold 3 and fuel inlet orifices 4 positioned at the first end 40 of the anode separator plate. However, in contrast to other embodiments described herein, as shown in FIG. 10, the anode flow field of face 2 comprises not channels, but rather a pattern of raised dots 31. As will be understood by those skilled in the art upon reading this disclosure, the raised dots 31 may have alternative shapes to the circles shown, i.e. squares, triangles, or ovals. Expended fuel exits the plate via the fuel outlet orifices 5 positioned at the second end 50 of the anode separator plate to a fuel outlet manifold 6 depicted in face 2, FIG. 10.

Figure 11:
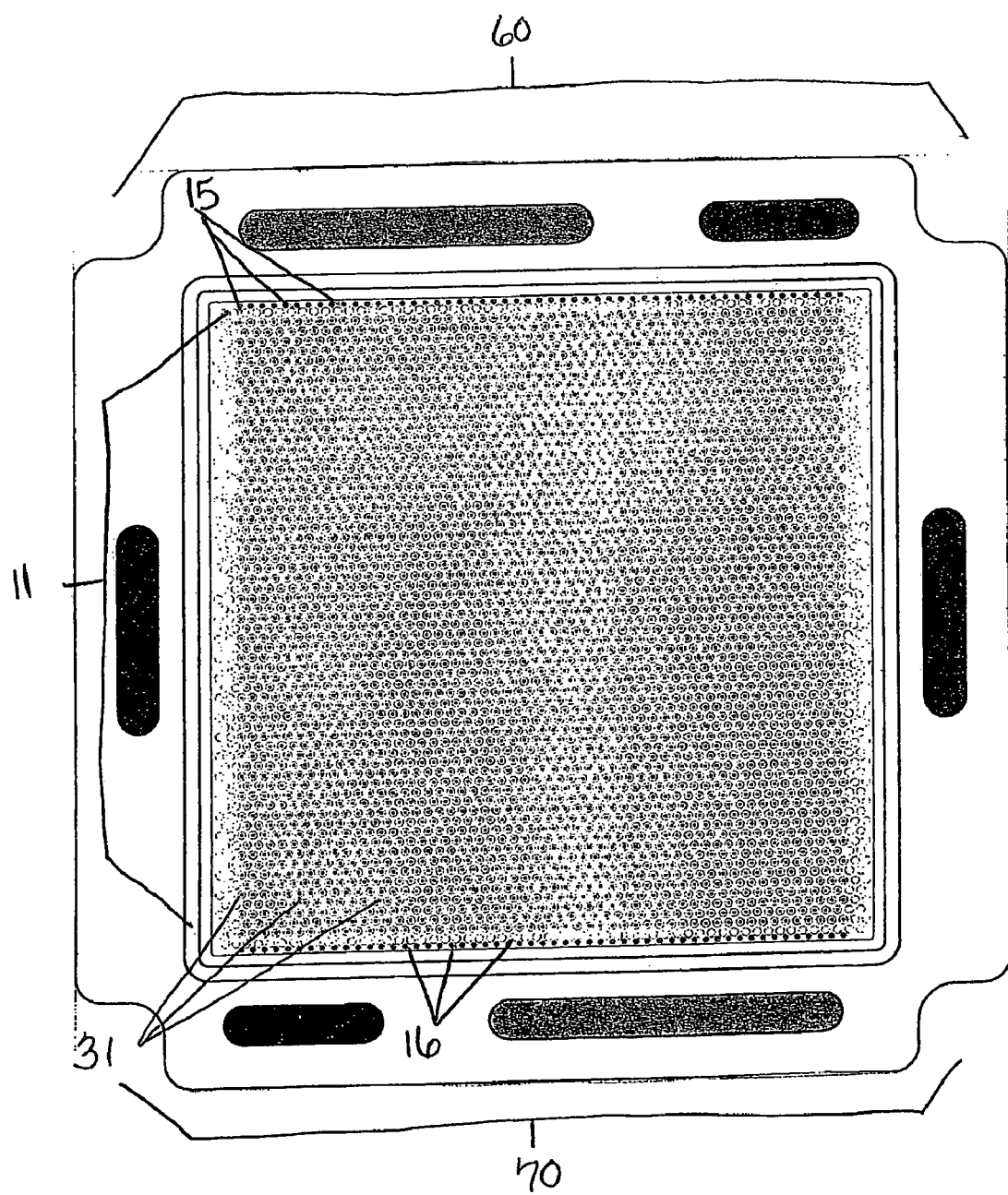
Figure 12:
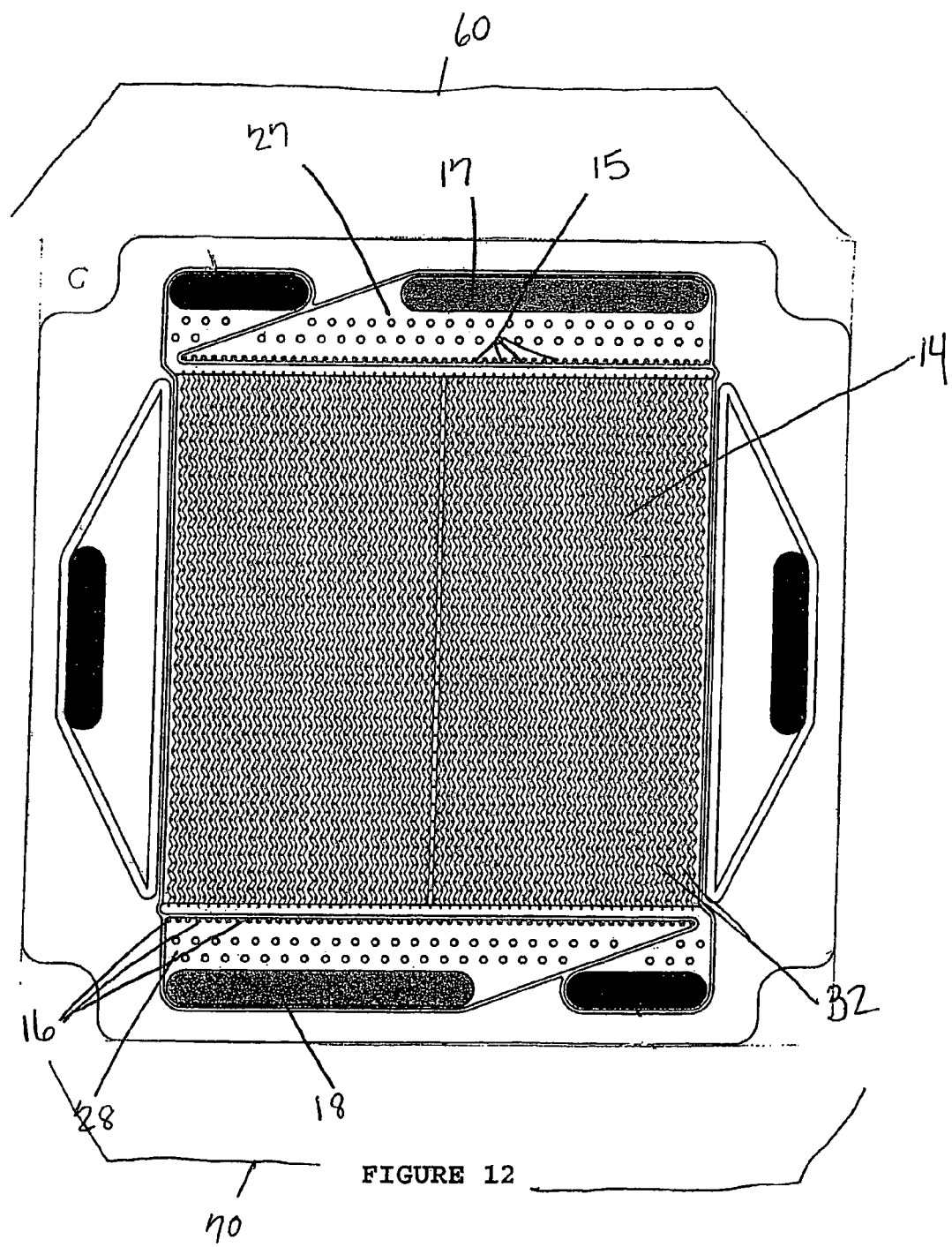
Figure 13:
FIG. 13 provides a cross-sectional view of the plurality of open channels through which coolant can traverse from face 4 (FIG. 12) to face 3 (FIG. 11) of the plate.

FIGS. 11 and 12 provide diagrams of faces 3 and 4, respectively of a cathode separator plate used with this embodiment. As shown in FIG. 11, in this embodiment, face 3 comprising the cathode flow field 11, like the anode flow field 7, comprises a pattern of raised dots 31. As will be understood by those skilled in the art upon reading this disclosure, the raised dots may have an alternative shape to the circles shown, i.e. squares, triangles, or ovals. Face 4 of the cathode separator plate is depicted in FIG. 12 and shows the gas inlet orifices 15 positioned at the third end 60 of the cathode separator plate and gas outlet orifices 16 positioned at the fourth end 70 of the cathode separator plate which feed gas to and allow gas to exit, respectively, from the cathode flow field 11 of face 3 of the cathode separator plate. As shown in FIG. 12, face 4 further comprises a cooling cavity 14 comprising a plurality of ribbed grooves, each groove comprising a plurality of open channels 32 through which coolant can traverse from face 4 to face 3 of the plate. Each open channel exits at a center of a raised dot which makes up the cathode flow field. See FIG. 13.

What is claimed is:

1. A fuel cell comprising:
(a) an anode separator plate comprising a first face and a second face and a first end and a second end, said first face of the anode separator plate comprising a plurality of fuel inlet orifices extending through the anode separator plate to the second face of the anode separator plate, said fuel inlet orifices being connected to a fuel inlet manifold via a fuel inlet transfer cavity, and a plurality of fuel exit orifices extending through the anode separator plate to the second face of the anode separator plate, said fuel exit orifices connected to a fuel outlet manifold via a fuel outlet transfer cavity, wherein each fuel inlet orifice is located adjacent to a fuel outlet orifice at the first end of the anode separator plate; and said second face of the anode separator plate comprising an anodic flow field of fuel delivery channels and fuel exit channels, each fuel delivery channel of the anodic flow field initiating at a fuel inlet orifice at the first end of the anode separator plate and extending to the second end of the anode separator plate where it connects to a fuel exit channel adjacent and parallel to the fuel delivery channel, said fuel exit channel terminating at a fuel exit orifice at the first end of the anode separator plate; and
(b) a cathode separator plate comprising a third face and a fourth face and a third end and fourth end, said third face of the cathode separator plate comprising a cathode flow field of gas delivery channels and gas outlet channels, each gas delivery channel of the cathode flow field initiating at a gas inlet orifice at the third end of the cathode separator plate and extending to the fourth end of the cathode separator plate where it connects to a gas outlet channel adjacent and parallel to the gas delivery channel, said gas delivery channel terminating at a gas exhaust orifice at the third end of the cathode separator plate; and said fourth face of the cathode separator plate comprising a plurality of gas inlet orifices positioned at the third end of the cathode separator plate extending through the cathode separator plate to the third face of the cathode separator plate, said gas inlet orifices connected to a gas inlet manifold via a gas inlet transfer cavity, a plurality of gas outlet orifices positioned at the third end of the cathode separator plate extending through the cathode separator plate to the third face of the cathode separator plate, said gas outlet orifices connected to a gas outlet transfer cavity and a gas outlet manifold, wherein each gas inlet orifice is located adjacent to a gas outlet orifice at the third end of the cathode separator plate, a cooling cavity with ribbed grooves and coolant inlet and coolant outlet manifolds for entry and exit of coolant flowing along the cooling cavity, and an undulating sealed barrier on said fourth face which undulates alternately between the gas inlet and outlet orifices at the third end of the cathode separator plate, and which abuts up to an adjacent anode plate in series and directs fuel supply from the fuel inlet transfer cavity to the fuel inlet orifices and fuel exhaust from the fuel outlet orifices to the fuel outlet manifold via the fuel outlet transfer cavity.

\* \* \* \* \*